(12) United States Patent
Heatley et al.

(10) Patent No.: US 7,697,795 B2
(45) Date of Patent: Apr. 13, 2010

(54) ACOUSTIC MODULATION

(75) Inventors: David J T Heatley, Felixstowe (GB); Edmund S Sikora, Ipswich (GB)

(73) Assignee: British Telecommunications public limited company, London (GB)

( * ) Notice: Subject to any disclaimer, the term of this patent is extended or adjusted under 35 U.S.C. 154(b) by 113 days.

(21) Appl. No.: 11/885,275

(22) PCT Filed: Mar. 2, 2006

(86) PCT No.: PCT/GB2006/000750
§ 371 (c)(1),
(2), (4) Date: Aug. 29, 2007

(87) PCT Pub. No.: WO2006/092606
PCT Pub. Date: Sep. 8, 2006

(65) Prior Publication Data
US 2008/0166120 A1      Jul. 10, 2008

(30) Foreign Application Priority Data
Mar. 4, 2005   (EP) .................................. 05251319

(51) Int. Cl.
*G02F 1/335* (2006.01)
(52) U.S. Cl. ......................................................... 385/7
(58) Field of Classification Search ...................... 385/7
See application file for complete search history.

(56) References Cited

U.S. PATENT DOCUMENTS

| 4,297,887 A | 11/1981 | Bucaro |
| 4,397,551 A | 8/1983 | Bage et al. |
| 4,443,700 A | 4/1984 | Macedo et al. |
| 4,463,451 A | 7/1984 | Warmack et al. |
| 4,538,103 A | 8/1985 | Cappon |
| 4,572,949 A | 2/1986 | Bowers et al. |
| 4,593,385 A | 6/1986 | Chamuel |

(Continued)

FOREIGN PATENT DOCUMENTS

EP          0 251 632 A2     1/1988

(Continued)

OTHER PUBLICATIONS

International Search Report mailed May 8, 2006 in PCT/GB2006/000750.

(Continued)

*Primary Examiner*—Sarah Song
(74) *Attorney, Agent, or Firm*—Nixon & Vanderhye P.C.

(57) ABSTRACT

The present invention relates to the modulation of light traveling along a waveguide, in particular to the acoustic modulation of the light. There is provide a modulator arrangement for acoustically modulating optical radiation. The modulator arrangement has: a waveguide portion formed from a flexible material; a vibrator element for generating acoustic vibrations; and, a coupling arrangement for releasably coupling the vibrating element to the waveguide portion, the coupling arrangement including a first coupling member secured to the waveguide portion, and a second coupling member secured to the vibrator element. The second coupling member is removable from the first coupling member, and the first coupling member has a substantially rigid portion for retaining the shape of the waveguide when the second coupling member is removed from the first coupling member.

21 Claims, 7 Drawing Sheets

U.S. PATENT DOCUMENTS

| | | | |
|---|---|---|---|
| 4,649,529 A | 3/1987 | Avicola |
| 4,654,520 A | 3/1987 | Griffiths |
| 4,668,191 A | 5/1987 | Plischka |
| 4,688,200 A | 8/1987 | Poorman et al. |
| 4,697,926 A | 10/1987 | Youngquist et al. |
| 4,708,471 A | 11/1987 | Beckmann et al. |
| 4,708,480 A | 11/1987 | Sasayama et al. |
| 4,770,535 A | 9/1988 | Kim et al. |
| 4,781,056 A | 11/1988 | Noel et al. |
| 4,805,160 A | 2/1989 | Ishii et al. |
| 4,847,596 A | 7/1989 | Jacobson et al. |
| 4,907,856 A * | 3/1990 | Hickernell ............... 385/1 |
| 4,976,507 A | 12/1990 | Udd |
| 4,991,923 A | 2/1991 | Kino et al. |
| 4,994,668 A | 2/1991 | Lagakos et al. |
| 4,994,886 A | 2/1991 | Nadd |
| 5,004,912 A | 4/1991 | Martens et al. |
| 5,015,842 A | 5/1991 | Fradenburgh et al. |
| 5,046,848 A | 9/1991 | Udd |
| 5,051,965 A | 9/1991 | Poorman |
| 5,093,568 A | 3/1992 | Maycock |
| 5,104,391 A * | 4/1992 | Ingle et al. ............... 606/11 |
| 5,140,559 A | 8/1992 | Fisher |
| 5,173,743 A | 12/1992 | Kim |
| 5,187,362 A | 2/1993 | Keeble |
| 5,191,614 A | 3/1993 | LeCong |
| 5,194,847 A | 3/1993 | Taylor et al. |
| 5,206,924 A | 4/1993 | Kersey |
| 5,223,967 A | 6/1993 | Udd |
| 5,311,592 A | 5/1994 | Udd |
| 5,313,266 A | 5/1994 | Keolian et al. |
| 5,319,609 A | 6/1994 | Regnault |
| 5,351,318 A | 9/1994 | Howell et al. |
| 5,355,208 A | 10/1994 | Crawford et al. |
| 5,361,130 A | 11/1994 | Kersey et al. |
| 5,363,463 A | 11/1994 | Kleinerman |
| 5,373,487 A | 12/1994 | Crawford et al. |
| 5,379,357 A | 1/1995 | Sentsui et al. |
| 5,412,464 A | 5/1995 | Thomas et al. |
| 5,457,998 A | 10/1995 | Fujisaki et al. |
| 5,473,459 A | 12/1995 | Davis |
| 5,491,573 A | 2/1996 | Shipley |
| 5,497,233 A | 3/1996 | Meyer |
| 5,500,733 A | 3/1996 | Boisrobert et al. |
| 5,502,782 A | 3/1996 | Smith |
| 5,604,318 A | 2/1997 | Fasshauer |
| 5,636,021 A | 6/1997 | Udd |
| 5,637,865 A | 6/1997 | Bullat et al. |
| 5,663,927 A | 9/1997 | Olson et al. |
| 5,691,957 A | 11/1997 | Spiesberger |
| 5,694,114 A | 12/1997 | Udd |
| 5,754,293 A | 5/1998 | Farhadiroushan |
| 5,767,950 A | 6/1998 | Hawver et al. |
| 5,778,114 A | 7/1998 | Eslambolchi et al. |
| 5,936,719 A | 8/1999 | Johnson |
| 5,975,697 A | 11/1999 | Podoleanu |
| 5,991,479 A | 11/1999 | Kleinerman |
| 6,072,921 A | 6/2000 | Frederick et al. |
| 6,075,628 A | 6/2000 | Fisher et al. |
| 6,115,520 A | 9/2000 | Laskowski et al. |
| 6,194,706 B1 | 2/2001 | Ressl |
| 6,195,162 B1 | 2/2001 | Varnham et al. |
| 6,269,198 B1 | 7/2001 | Hodgson et al. |
| 6,269,204 B1 | 7/2001 | Ishikawa |
| 6,285,806 B1 | 9/2001 | Kersey et al. |
| 6,315,463 B1 | 11/2001 | Kropp |
| 6,459,486 B1 | 10/2002 | Udd et al. |
| 6,594,055 B2 | 7/2003 | Snawerdt |
| 6,625,083 B2 | 9/2003 | Vandenbroucke |
| 6,628,570 B2 | 9/2003 | Ruffa |
| 6,788,417 B1 | 9/2004 | Zumberge et al. |
| 6,859,419 B1 | 2/2005 | Blackmon et al. |
| 2001/0028766 A1 | 10/2001 | Hatami-Hanza |
| 2002/0196447 A1 | 12/2002 | Nakamura et al. |
| 2003/0103211 A1 | 6/2003 | Lange et al. |
| 2003/0117893 A1 | 6/2003 | Bary |
| 2003/0174924 A1 | 9/2003 | Tennyson |
| 2004/0027560 A1 | 2/2004 | Fredin et al. |
| 2004/0113056 A1 | 6/2004 | Everall et al. |
| 2004/0201476 A1 | 10/2004 | Howard |
| 2006/0256344 A1 | 11/2006 | Sikora |
| 2007/0009600 A1 | 1/2007 | Edgren et al. |
| 2007/0065150 A1 | 3/2007 | Sikora et al. |
| 2007/0264012 A1 | 11/2007 | Healey et al. |
| 2008/0013161 A1 | 1/2008 | Tokura et al. |
| 2008/0018908 A1 | 1/2008 | Healey et al. |
| 2008/0123085 A1 | 5/2008 | Sikora et al. |
| 2008/0219093 A1 | 9/2008 | Heatley et al. |
| 2008/0219660 A1 | 9/2008 | Healey et al. |
| 2008/0278711 A1 | 11/2008 | Sikora et al. |
| 2009/0014634 A1 | 1/2009 | Sikora et al. |
| 2009/0097844 A1 | 4/2009 | Healey |
| 2009/0103928 A1 | 4/2009 | Healey et al. |
| 2009/0135428 A1 | 5/2009 | Healey |

FOREIGN PATENT DOCUMENTS

| | | |
|---|---|---|
| EP | 0 360 449 A2 | 3/1990 |
| EP | 0364093 | 4/1990 |
| EP | 0 376 449 A1 | 7/1990 |
| EP | 0 377 549 | 7/1990 |
| EP | 0513381 | 11/1992 |
| EP | 0 592 690 A1 | 4/1994 |
| EP | 0 794 414 A2 | 9/1997 |
| EP | 0 821 224 A2 | 1/1998 |
| EP | 0 953 830 A2 | 11/1999 |
| EP | 1 037 410 A2 | 9/2000 |
| EP | 1 096 273 A2 | 5/2001 |
| EP | 1236985 | 9/2002 |
| EP | 1 385 022 A1 | 1/2004 |
| EP | 1 496 723 A1 | 1/2005 |
| FR | 2 751 746 | 1/1998 |
| GB | 2 015 844 A | 9/1979 |
| GB | 2 019 561 A | 10/1979 |
| GB | 2 113 417 A | 8/1983 |
| GB | 2 126 820 A | 3/1984 |
| GB | 2 205 174 A | 11/1988 |
| GB | 2 219 166 A | 11/1989 |
| GB | 2 262 803 A | 6/1993 |
| GB | 2 264 018 A | 8/1993 |
| GB | 2 401 738 A | 11/2004 |
| JP | 2001-194109 | 7/2001 |
| WO | WO 93/25866 A1 | 12/1993 |
| WO | WO 97/05713 A1 | 2/1997 |
| WO | WO 01/67806 A1 | 9/2001 |
| WO | WO 02/065425 A1 | 8/2002 |
| WO | WO 03/014674 A2 | 2/2003 |
| WO | WO 2005/008443 A2 | 1/2005 |

OTHER PUBLICATIONS

Liang et al., "Modified White-Light Mach Zehnder Interferometer for Direct Group-Delay Measurements," Applied Optics, vol. 37, Issue 19, Abstract, Jul. 1998.

Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.

International Search Report for PCT/GB2005/003594 dated Dec. 16, 2005.

International Search Report for PCT/GB2005/003680 mailed Dec. 1, 2005.

International Search Report mailed Jan.14, 2005 in International Application No. PCT/GB2004/004169.

UK Search Report dated Dec. 4, 2003 in GB Application No. GB 0322859.0.
Gupta et al., "Capacity Bounding of Coherence Multiplexed Local Area Networks Due to Interferometric Noise," IEEE Proc.-Optoelectron., vol. 144, No. 2, pp. 69-74, Apr. 1997.
U.S. Appl. No. 10/573,266, filed Mar. 23, 2006, Sikora et al.
U.S. Appl. No. 11/403,200, filed Apr. 13, 2006, Sikora et al.
U.S. Appl. No. 11/791,927, filed May 31, 2007, Sikora et al.
U.S. Appl. No. 11/791,923, filed May 31, 2007; Healey et al.
U.S. Appl. No. 11/663,954, filed Mar. 28, 2007, Sikora et al.
U.S. Appl. No. 11/663,957, filed Mar. 28, 2007, Healey et al.
U.S. Appl. No. 11/885,400, filed Aug. 27, 2007, Heatley et al.
U.S. Appl. No. 11/916,054, filed Nov. 30, 2007, Sikora et al.
U.S. Appl. No. 11/887,382, filed Sep. 28, 2007, Healey et al.
U.S. Appl. No. 11/918,434, filed Oct. 12, 2007; Healey et al.
U.S. Appl. No. 12/295,784, filed Oct. 2, 2008; Healey et al.
U.S. Appl. No. 12/280,051, filed Aug. 20, 2008, Healey.
U.S. Appl. No. 12/280,047, filed Aug. 20, 2008, Healey.
U.S. Appl. No. 12/280,038, filed Aug. 20, 2008, Healey.
Office Action dated Sep. 19, 2008 in U.S. Appl. No. 10/573,266.
Office Action dated Mar. 17, 2009 in U.S. Appl. No. 10/573,266.
Office Action dated Jan. 23, 2009 in U.S. Appl. No. 11/403,200.
Office Action dated Jun. 6, 2008 in U.S. Appl. No. 11/403,200.
Office Action dated Aug. 23, 2007 in U.S. Appl. No. 11/403,200.
Office Action dated Jul. 7, 2009 in U.S. Appl. No. 11/885,400.
Office Action Jan. 14, 2009 in U.S. Appl. No. 11/885,400.
Office Action dated May 14, 2009 in U.S. Appl. No. 11/916,054.
Office Action dated Jul. 8, 2009 in U.S. Appl. No. 11/791,927.
Office Action dated Sep. 5, 2008 in U.S. Appl. No. 11/791,923.
Office Action dated Feb. 26, 2009 in U.S. Appl. No. 11/791,923.
International Search Report dated Nov. 22, 2005.
International Search Report mailed Jan. 14, 2005 in International Application No. PCT/GB2004/004169.
International Search Report mailed May 29, 2006 in PCT/GB2006/000759.
International Search Report mailed Jun. 30, 2006, dated Jun. 7, 2006, in PCT/GB2006/001173.
International Search Report mailed Jul. 17, 2007 in PCT/GB2007/001188.
International Search Report mailed Jul. 27, 2006 in PCT/GB2006/001993.
International Search Report mailed Apr. 13, 2007 in PCT/GB2007/000360.
International Search Report mailed Apr. 18, 2007 in PCT/GB2007/000343.
International Search Report mailed May 2, 2007 in PCT/GB2007/000359.
International Search Report dated May 16, 2006 in PCT/GB2005/004850.
International Search Report dated Mar. 15, 2006, mailed Mar. 24, 2006 in PCT/GB2005/004873.
International Search Report mailed May 24, 2006 in PCT/GB2006/001325.
UK Search Report dated May 24, 2005 in GB506591.7.
Yilmaz M. et al., "Broadband vibrating quartz pressure sensors for tsunameter and other oceanographic applications," Oceans '04, MTTS/IEEE Techno-Ocean '04, Kobe, Japan, Nov. 9-12, 2004, Piscataway, NJ, USA, IEEE, Nov. 9, 2004, pp. 1381-1387, XP010776555; Internet version, Oceans 2004, Kobe, Japan, pp. 1-7, Redmond, WA USA.
Szustakowski et al., Recent Development of Fiber Optic Sensors for Perimeter Security, Military University of Technology, IEEE 2001, pp. 142-148.
"Fading Rates in Coherent OTDR," Electronics Letters, vol. 20, No. 11, May 24, 1984.

* cited by examiner

Vibrating transducer embedded in rigid clamp

Data cable

Rigid wedge couples transducer vibrations to fibre

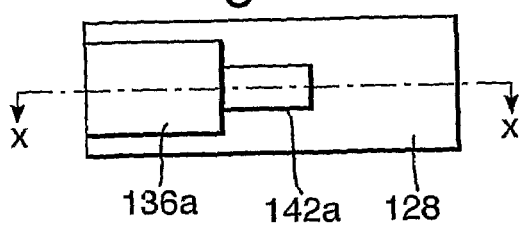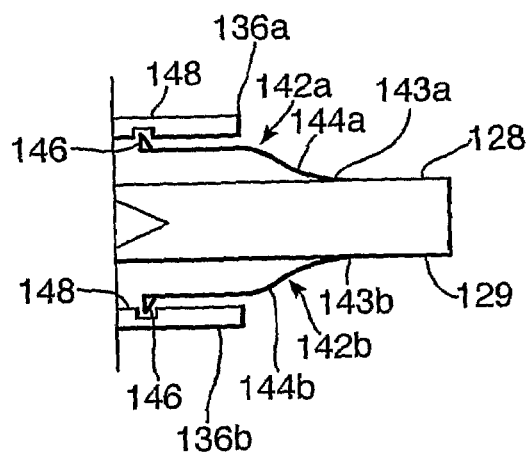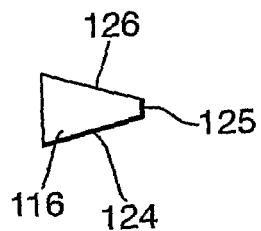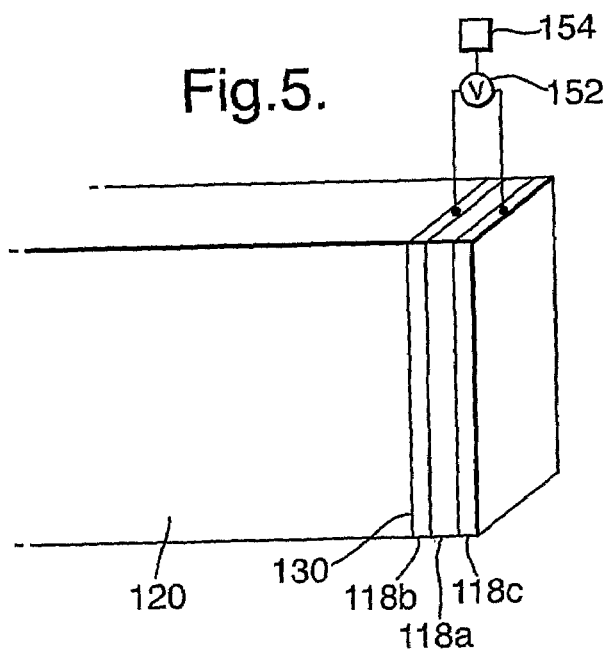

ACOUSTIC MODULATION

The present invention relates to the modulation of light traveling along a waveguide, in particular to the acoustic modulation of the light.

It is known to acoustically modulate light travelling along a waveguide. Systems for this purpose are however not well suited to situations where a modulator needs to be temporarily coupled to a fibre.

According to the present invention, there is provide a modulator arrangement for acoustically modulating optical radiation, the modulator arrangement comprising: a waveguide portion; a vibrator element for generating acoustic vibrations; and, a coupling arrangement for releasably coupling the vibrating element to the waveguide portion, the coupling arrangement including a first coupling member secured to the waveguide portion, and a second coupling member secured to the vibrator element, the second coupling member being removable from the first coupling member, the waveguide portion being secured to the first coupling member such that the waveguide portion remains secured to the first coupling member when the second coupling member is removed from the first coupling member.

Because the waveguide portion remains secured to the first coupling member when the second coupling member is removed from the first coupling member, the waveguide is less likely to be damaged when the vibrator element is decoupled from the waveguide. In addition, because the second coupling member is removable, the second coupling member may be released or otherwise detached from the first coupling member and coupled to the waveguide at a different location.

Normally, the waveguide portion will be flexible, in which case the first coupling member will preferably have a substantially rigid portion for retaining the shape of the waveguide when the first and coupling members are removed from one another.

Preferably the first and second coupling members will have respective first and second cooperating surfaces which oppose one another when the coupling means is in the coupled state. The area of the cooperating surface of at least the first coupling member can then be made larger than the area that the waveguide alone would present for coupling, thereby improving the coupling efficiency over that which would be expected from coupling to an optical waveguide, in particular if the optical waveguide is an optical fibre with a small cross section The first coupling member will preferably be secured to the waveguide portion in a permanent manner, such that the waveguide remains secured to the first coupling member when the second coupling member is repeatedly removed from the first coupling member.

A bore will preferably be provided in the first coupling member though which the optical waveguide portion extends, thereby securing the fibre to the first coupling member, at least in respect of movement in a radial direction. Preferably, the bore will be formed form a substantially rigid material to protect the waveguide. The fibre may be introduced into an existing bore. Otherwise, the bore may be formed around the fibre. In one embodiment, the first coupling member includes a first component and a second component, each component having a respective arcuate receiving surface, such that when the first and second component are brought together, the receiving surfaces form a bore. Such an embodiment will be useful for retro fitting the first coupling member around a fibre following an existing path, since the first and second components can be brought together around the fibre.

Preferably, at least the first coupling member will be arranged to provide, in the coupled state, a coupling medium for carrying acoustic vibrations to the waveguide. In such a situation, the waveguide will be coupled to the second coupling member through the first coupling member. Likewise, the second coupling member will also be configured to carry acoustic vibrations, such that acoustic vibrations can travel from the vibration element and through the first and second coupling members before reaching the waveguide.

A plurality of first coupling members may be provided at intervals along a waveguide path. If the waveguide is an optical fibre, the fibre will preferably retain its coating between the regions where it is coupled to first coupling members. The or each first coupling member may be fixedly secured to a structural element such as a wall or other immovable object, so that a fixed point of connection is provided: that is, the waveguide is not loose at the point where the modulator is to be coupled to the waveguide. This will make it easier to quickly couple the second coupling member to the waveguide. Each first coupling member will preferably be provided at an attachment point where the fibre is accessible (through the first coupling member) for modulation. Between attachment points, the waveguide may be inaccessible, for example because it is located behind or within a wall.

A monitoring station will preferably be provided for monitoring the modulation applied, by the modulator arrangement, to sensing signals travelling along the waveguide. The sensing signals will preferably be formed by pairs of signal copies, the signal copies preferably being transmitted along the waveguide with a time delay relative to one another. A disturbance is likely to affect each signal copy of a pair in a different manner, with a result that the combination of the re-aligned signal copies can be used to retrieve information modulated onto the signals The signal copies of a pair may be transmitted on a common waveguide, and will then preferably be returned on the common waveguide. However, signal copies of a pair may travel on different waveguides, cables or fibres, which may follow the same or diverse paths.

Preferably, the monitoring station will be configured to, transmit the sensing signals along an optical waveguide, the sensing signals being returned to the monitoring station from a point along the waveguide that is beyond the region where a modulation is being applied. The signals may be reflected by a reflector, for example a mirrored surface at an end of the waveguide or fibre. Alternatively or in addition, the signals may be returned by a process of distributed backscattering along the waveguide, preferably Rayleigh backscattering. For Rayleigh backscattering to return the signals sufficiently strongly, preferably 1 km of excess waveguide will be provided beyond the furthest point where a disturbance is to be detected. The amount of excess waveguide required will depend on the wavelength of the light (shorter wavelengths requiring shorter lengths of fibre), on the output power of the optical source for the sensing signals, and the sensitivity of a detector for detecting the returned sensing signals. Preferably, the wavelength will be between 1 and 2 microns, for example in the silica transmission windows at 1550 mm, 1480 nm or 1310 nm.

Information may be received from the modulation point by performing the following steps: receiving from a remote region returned signal copies previously transmitted to the remote region, the remote region residing beyond the location at which a modulation is applied; and, combining one signal copy of a pair with the other signal copy of that pair, such that the combination signal is representative of the applied modulation.

The output signals from a source will preferably have an irregular component, in which case the step of copying, at least in part, the output signal from the source will preferably result in the irregular component being common to each of the signal copies of a pair. Other characteristics of the signal need not be the same in each signal copy: for example, the signal copies may have different amplitudes. The irregular component will preferably be random, or pseudo random (by pseudo random, it is meant that although in theory a component is possible to predict, the time or processing power required to do this will make it in practice impossible to predict). Since the output signal has a waveform, the irregular component may be provided by the phase of the waveform, for example if the waveform has randomly occurring phase variations.

The waveform may conveniently be provided by an optical source having a short coherence time, preferably less than 10 pico seconds or even less than 1 pico second, the waveform being composed of a succession of wavetrains, each having a respective coherence length. Generally, the waveform will be much longer than individual wavetrains. The signals will in this situation normally be formed from successive portions of the waveform, without well defined boundaries being needed between successive signals or signal copies.

In a preferred embodiment, the output from the optical source is fed to an interferometer stage, such as an un-balanced Mach Zehnder interferometer, where the signal is copied, one copy being channeled to one path of the interferometer, whilst the other copy is channeled to another path of the interferometer, the transit time associated with each path being different, such that a relative or differential delay results between the time at which the signal copies are transmitted from the interferometer stage. The same interferometer stage can then be employed to re-align the returned signal copies of a pair in a particularly convenient manner, since the relative delay imposed in the outbound direction will be the same as the relative delay imposed in the return direction, this being in each case determined by the difference in the transit times of the two paths. In such a situation, the combination of the re-aligned signals will result in an interference signal being output from the interferometer stage.

The differential delay will preferably be chosen in dependence on the average coherence time of the source. The differential delay will preferably be much longer than the coherence time. Preferably, the ratio of the differential delay to the coherence time will be greater or equal to 1:3, yet more preferably 1:5 or even yet more preferably 1:10.

The delay line of the interferometer may be 20 km or more, corresponding to a temporal offset of about 100 microseconds.

The signal may be output from the source as a continuous stream. However, the output from the source may also be pulsed or operate in burst mode.

Further aspects of the present invention are specified in the appended claims. The invention will now be described, by way of example only, with reference to the following drawings in which:

FIG. 3a is a plan view of clasp arrangement for retaining the first and second coupling members in a coupled position;

FIG. 3b is a cross sectional view along the line X-X of FIG. 3a;

FIG. 4 is a cross sectional view of the first coupling member according to a further embodiment;

FIG. 5 shows a rear portion of the second member according to another embodiment;

Figure 1:
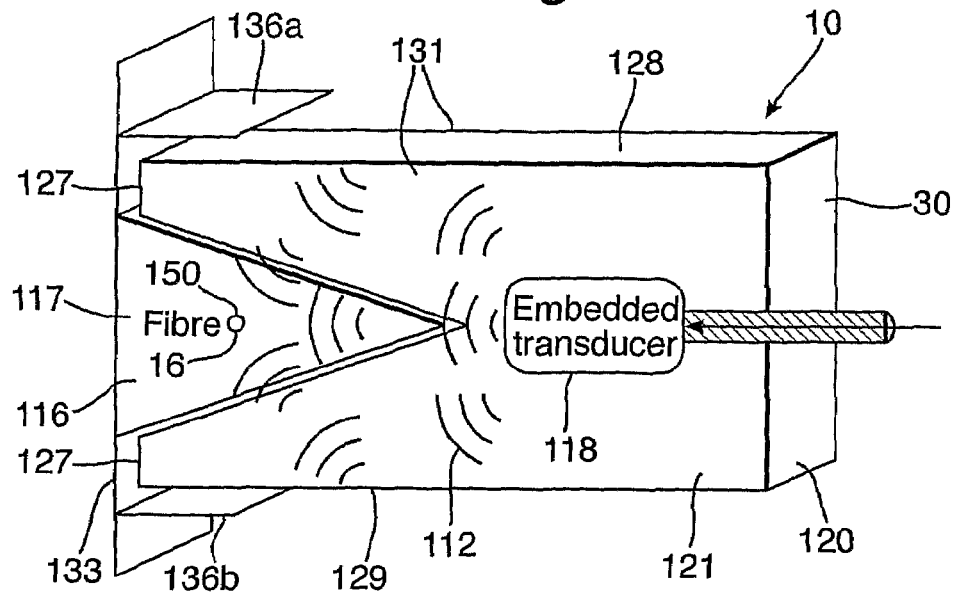
FIG. 1 shows a perspective view of a coupling arrangement according to the present invention, a first and a second member being shown in a coupled position.

FIG. 1 shows a coupling arrangement 10 for coupling acoustic vibrations 112 to an optical fibre 16. An axially extending portion of the fibre 16 is acoustically coupled to a first coupling member 116, the first coupling member being formed from a first coupling material 117 in which the fibre 16 is embedded. A transducer element 118 for generating acoustic vibrations is acoustically coupled to a second coupling member 120 formed from a second coupling material 121, the transducer being embedded in the second coupling material.

Figure 2A:
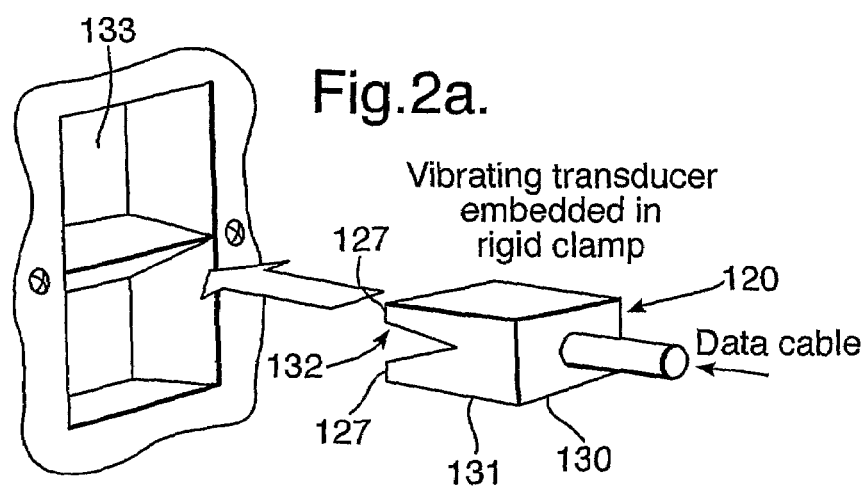
FIG. 2a shows the first and second coupling members of FIG. 1 in a decoupled position.
Figure 2B:
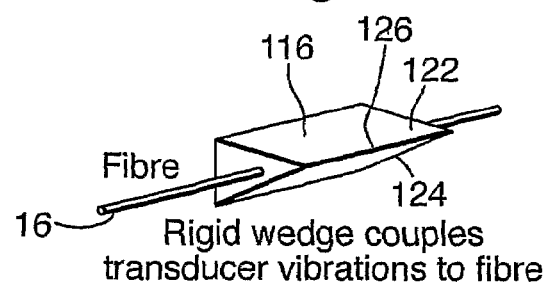
FIG. 2b is a schematic view illustrating an optical fibre extending through the first coupling member.

As is shown more clearly in FIGS. 2a, 2b where the first and second coupling members are in a de-coupled state, the first coupling member 116 is generally wedge-shaped, having angled facets which come together along a line extending generally parallel to the fiber.

The second coupling member is generally rectangular, having (in the orientation of FIG. 2) a forward surface 127, upper and lower surfaces 128, 129, a rear surface 130 and side surfaces 131. A deep V-shaped groove 132 is provided in the forward surface 131, which groove is dimensioned to received the first coupling member 116. The angle of the groove sidewalls closely matches that of the angled facets of the first coupling member, so that when the first coupling member is received in the second coupling member, the respective opposing walls and facets are in intimate contact.

A backing plate 132 is provided, on which the first coupling member is securely mounted. The backing plate has upstanding wall portions 136a, 136b arranged such than when the first coupling member is received in the second coupling member, the wall portions 136a, 136b overlie the respective upper and lower surfaces 128, 129 of the first coupling member.

In order to releasably secure the first coupling member to the second coupling member, a clasp arrangement 140 is provided in which resilient tongues 142a, 142b are securely affixed to respective upper and lower surfaces of the second coupling member. The tongues are each affixed at a rear end thereof, the tongues each having a curved portion in an intermediate region such that the forward region of each tongue is displaced from the respective surface to which it is attached. Towards the forward end of each tongue, there is provided an upstanding portion 146. When the second coupling member is moved in the forward direction (indicated by the arrow of FIG. 2a) into a coupled position, the upstanding portion of each tongue engages a ridge 148 in the respective upper and lower wall portions 136a, 136b, thereby securing the second coupling member in position. The second coupling member can them be released by depressing the first and second tongues 142a, 142b.

In the example of FIGS. 1 and 2, the first coupling member tapers to a pointed tip. However, in one embodiment shown in FIG. 4, the tip of the first coupling member is removed, such that the wedge tapers to a surface 125 rather than a line. This will make it more likely that the first coupling member will be in good acoustic contact with the second coupling member when the two are together.

The first coupling member 116 has a bore 150 through which the fibre 16 extends. As the width of the bore will be slightly larger than that of the fibre 16, a filler such as potting putty or gel may be used to fill the annulus region between the fibre and the inner wall of the bore. The portion of fibre within the bore may retain its protective coating. Otherwise, in order to improve the acoustic coupling the coating may be striped such that the glass material formed by the core and cladding of the fibre is exposed to the filler. As a further alternative, in order to embed the (possibly bared) fibre portion in the coupling material, the first coupling member may be formed around the fibre. This may be achieved by allowing the coupling material of the first coupling member to set or solidify around the fibre. The first coupling member with the fibre portion will in this situation be manufactured as a single unit.

The optical fibre 16 will extend at least a short distance beyond the bore, so that the fibre can be connected or spliced to a further fibre of an optical network or connected to a monitoring station.

Figure 6:
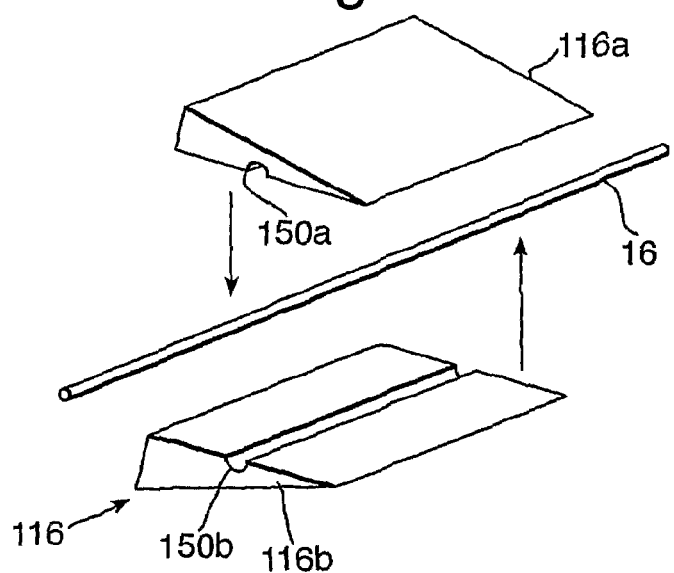
FIG. 6 shows another embodiment for the first coupling member

In another embodiment shown in FIG. 6, the first coupling member includes a first wedge portion 116a and a second wedge portion 116b, each component having a respective elongate groove, each groove having a arcuate receiving surface 150a, 150b (semicircular when viewed along the long axis of the groove), such that when the first and second wedge portions are brought together (in the arrow directions of FIG. 6), the receiving surfaces form a bore 150 in which the optical link can reside. This split wedge arrangement allows the first coupling member to be coupled to fibres that have already been laid, without necessarily having to break the fibre in order to pass the fibre through the bore.

The first and second coupling material will preferably be substantially rigid and will have the same acoustic impedance to facilitate the transfer of acoustic waves between the first and second coupling members. Likewise, the filler will be chosen to match the acoustic impedance of the first coupling member, as well as that of the optical fibre. In the embodiment of FIG. 1, the first and second coupling members are formed from quartz glass. However, the first and second coupling members may be formed from another material that is substantially rigid, such as a non-brittle but high modulus plastics material, for example.

In another embodiment, the transducer element 118 is mounted on the rear surface of the second coupling member, as shown in FIG. 5. The transducer element 118 includes rectangular layer of piezoelectric material 118a sandwiched between first and second electrode layers 118b, 118c, the first electrode layer being in contact with the rear surface 130 of the second coupling member 120. The electrodes may be a deposited film or layer of metal such as a gold, whilst the piezoelectric material, may be Lithium Niobate. Contacts will be provided towards an edge of the electrodes, for connecting electrical leads 149. An alternating voltage source 152 may be used to apply an oscillating voltage signal across the electrodes. The voltage source 152 will be controlled by a controller unit 154 for modulating the voltage source in order that a data signal may be carried by the oscillating voltage signal.

Since the fibre is flexible, in the absence of the first coupling member, a person may move the loose fibre when attempting to couple or decouple a piezoelectric element directly to the fibre, which movement may disturb communication already travelling along the fibre and/or damage the fibre. However, since the first coupling member is formed from a substantially rigid material, the first coupling member will protect the fibre 16 when the second coupling element is moved in and out of the coupling position.

Also, the first coupling member will to some extent guide the second coupling member into position, making it easier to couple the two members quickly. Furthermore, the first coupling member may be mounted on a wall surface 133 as shown in FIG. 2a, making it easier for a person to connect the coupling member with a single hand, leaving the other hand free. In the embodiment of FIG. 2a, the fibre 14 is buried behind the wall surface, the fibre only being accessible for acoustic coupling at the first coupling member.

Furthermore, the first coupling member will provide an enlarged coupling area (per unit length of fibre) for receiving acoustic vibrations as compared to the fibre or fibre cable alone, since a fibre or cable will normally have a small cross section. In contrast, the facets of the wedge portion of the first coupling member provided a large coupling area, the cross section of the first coupling member being larger than that of the fibre. Typically, the first coupling member will be 1 or 2 cm in length in the axial direction, the tip of the wedge extending 1 or 2 cm from the base plate, whilst the angle between the facets will be between 10 and 20 degrees.

Figure 7:
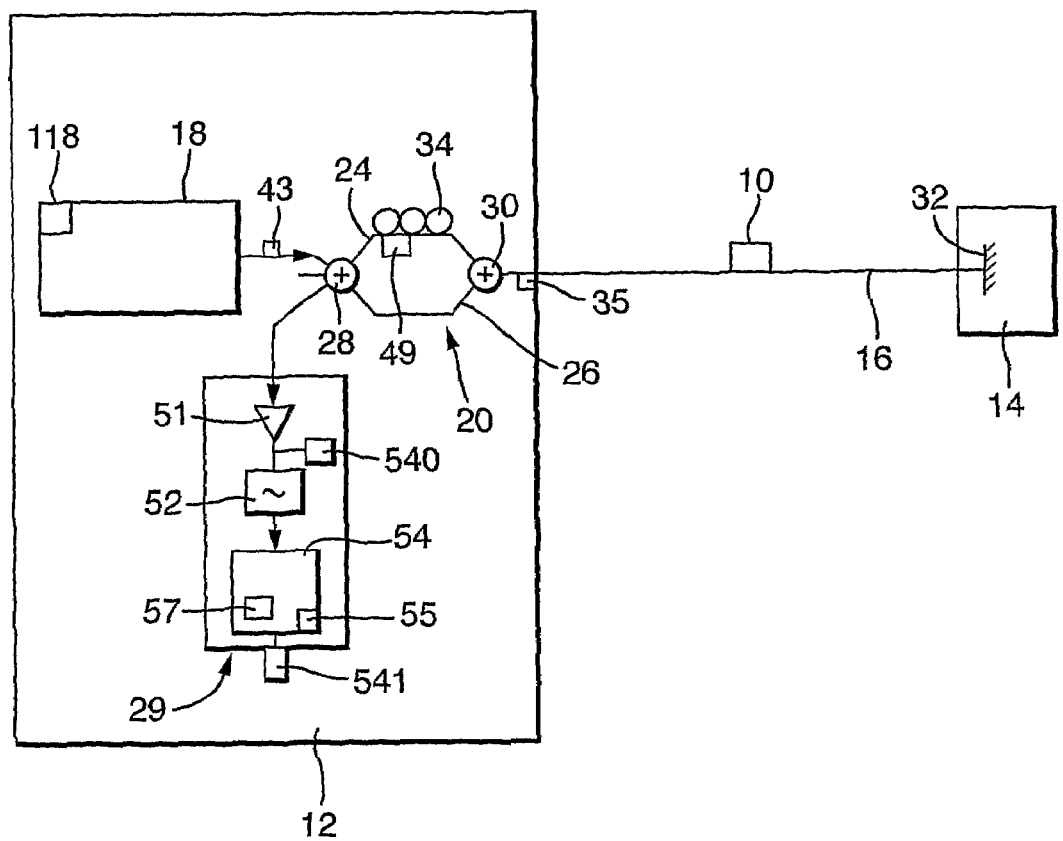
FIG. 7 shows an embodiment of a monitoring system for detecting a disturbance applied using the coupling arrangement of FIG. 1 to 6; and, FIGS. 8 to 13 show further embodiments of the invention.

FIG. 7 shows a communications system in which a monitoring station 12 is configured to receive acoustically modulated signals which have been applied to an optical link 16 using a modulator arrangement 10. The modulator arrangement is preferably of the form shown in FIGS. 1 to 6, in which a transducer 118 applies an acoustic wave-like disturbance to the link 16, the wave-like disturbance being amplitude modulated with an information signal.

In more detail, the monitoring station 12 includes an optical source 18 with a short coherence time (random phase changes in the output providing an irregular component to the signal). Sensing signals (waveform portions) from the optical source 18 are fed to an interferometer stage 20, here a Mach Zehnder interferometer having a first path 24 and a second path 26. The interferometer 20 includes a first coupling stage 28 for coupling optical radiation between the optical source 18, the first and second paths 24, 26, and a signal processing system 29. For light travelling in a forward direction, that is, away from the source, the first coupling stage 28 acts as a directional power (intensity) splitter, channeling light from the optical source 18 to each of the paths 24, 26, the power to each path being shared in a predetermined manner, here in a 50:50 ratio.

For each signal provided by the optical source 18 in a given time interval, that signal is copied such that there is a first copy and a second copy, the first and second copies being duplicates of one another. One copy travels along the first path 24 whilst the other copy travels along the second path 26. A second coupling stage 130 is provided for coupling light between the first and second paths 24, 26 and an output 135 of the interferometer, which output is connected to the optical link 16. For light travelling in the forward direction, the coupling stage 130 acts as a combiner, combining the light from the first and second paths and channeling this combined light to the interferometer output 135. The first path of the interferometer has a delay stage 134 for increasing the transit time of light travelling therealong between the first and second coupling stages 28, 130, such that the transit time for light travelling between the coupling stages 28, 130 is longer along the first path 24 than it is along the second path 26. For each signal produced by the optical source, the interferometer 20 serves to delay one of the signal copies relative to the other signal copy, the signal copies being transmitted onto the link 16 at different times to one another.

The additional (differential) delay imposed by the delay stage 134 is much greater than the coherence time of the optical source 18. Thus, when light travelling along the first and second paths is recombined by the second coupling stage 130, the interference between light travelling along the two paths averages out, such that on average (over a timescale much greater than the coherence time) the amplitude of light upon recombination at the second coupling stage 130 is of constant amplitude 18.

An outstation 14 is provided at a far end of the fibre. Reflector means, such as a reflecting surface 132 are provided at the outstation 14 for returning signals to the base station 12. For signals travelling in the return direction, that is, for return signals arriving at the interferometer 20 from the outstation 14, the second coupling stage 130 acts as a power splitter, in a similar fashion to the action of the first coupling stage 28 on light in the forward direction from the optical source 18. In this way, return signals are copied at the second coupling stage 130, one copy being channelled along the first path 24, whilst the other copy is channelled along the second path 26. The first coupling stage 28 then serves to combine light from the first and second paths in the return direction, channeling the interference signal (resulting from the combined light) to a signal processing system 29.

For each signal generated by the source 18, there are thus four duplicates of this signal: a non-retarded signal S0 which has traveled along the second path 26 of the interferometer 20 in both the forward and reverse directions; a first retarded signal S1 delayed by a delay D in the forward direction (but not the reverse direction); a second retarded signal S2 retarded by the delay D in the reverse direction (but not the forward direction); and, a twice-retarded signal S3 retarded by a delay 2D, signal S3 being retarded in each of the forward and reverse directions.

The first and second retarded signals S1, S2 which are retarded in one direction only will return to the first coupler stage 28 at the same time. In the absence of any disturbance in the fibre 16, these signals are copies of one another and the signals will interfere or otherwise combine constructively at the first coupler stage 28. However, if one of the pair of signals S1, S2 is modulated or otherwise modified by a disturbance along the fibre, the interference between the two signals will result in an interference signal having different spectral characteristics to the interference signal which would otherwise be produced in the absence of any disturbance to the fibre 16.

In the embodiments shown above, the transducer of the modulator arrangement generates a wave-like disturbance, which is coupled to an optical fibre. The result of this is that an elastic wave (preferably a bulk elastic wave) is launched into the transmission medium of the fibre. The elastic waves cause a local distortion of the glass structure, which changes the refractive index experienced by light travelling along the fibre. This change in refractive index caused a phase modulation in one or both of the (carrier) signals of a pair travelling along the link. However, the interference signal will be the result of interference between, on the one hand, a signal having been modulated by the disturbance at one time, and on the other hand, a signal modulated by the disturbance at another time, the two times being separated by the differential delay D. Thus, when an acoustic disturbance is applied to the optical link 16, the interference signal from the first coupling stage 28 will be a signal at the frequency of the applied acoustic disturbance. Likewise, any amplitude modulated applied to the acoustic signal will result in an interference signal with a corresponding amplitude modulation.

The frequency of the elastic wave may be a few kHz, but higher frequencies of a few MHz or more would allow for higher data rates.

The signal processing system includes: a photo-receiver 51 coupled to the first coupling stage 28 for converting optical signals into electrical signals; a filter 52 for receiving electrical signals from the photo-receiver 51 and filtering the electrical signals; and, a signal processing unit 54. If the information signal introduced by the modulator is an analogue signal, the processing unit 54 may simply be an amplifier, since the amplitude of the interference signal will vary in accordance with the amplitude of the applied acoustic signal. However, if the acoustic signal is amplitude modulated in a digital manner, the processing unit will be a digital system.

The light source may be a Light Emitting Diode, a Fabry-Perot Laser Diode, or a source of amplified spontaneous emission such as an Erbium-Doped Fibre Amplifier or a Semiconductor Optical Amplifier, but preferably the light source will be a Super Luminescent Diode, since this has a broad and smooth power spectrum, and a short coherence time of about 0.5 pico seconds. The radiation produced by the optical source will preferably be unpolarised, or alternatively a de-polarising unit 43 may be provided between the light source and the interferometer, for depolarising the light before the light is injected into the interferometer (the depolarising unit may be for example, a Fibre Lyot de-polariser). A depolariser 49 will preferably be provided in one of the paths of the interferometer, here, the first path, so that the polarisation of light from the first path combining in the return direction at the first coupler 28 is at least partially aligned with that of the light from the other path. Typically, the source will operate at a wavelength of between 1 micron and 2 microns, preferably around 1.31, 1.48 or 1.55 microns, in order to efficiently make use of standard telecommunications optical fibre, such fibre being configured to support single mode transmission at this wavelength. Typically, the fibre will have a single core of a diameter which is around 9 or 10 microns.

The first coupling stage 28, at the source side of the interferometer, will preferably be a 3×3 coupler (with some ports terminated), whereas the second coupling stage 130, at the transmission side, will preferably be a 2×2 coupler, with one port terminated. The 3×3 coupler is used in order to create a relative phase bias of $\phi_b = 120°$ between the optical fields on its output ports. This can be used to improve the sensitivity of the interferometer. (We denote the phase modulation due to a disturbance as $\phi_d(t)$.). It can be shown that the receiver ac output signal is proportional to: $r_{ac}(t) = k \cdot \cos\{\phi_b + \phi_d(t) + \phi_m(t)\}$ where, k is a constant of proportionality and $\phi_m(t)$ is the data phase modulation signal. The equation shows how the phase bias can be used to select a higher slope region of the Cosine function in order to improve the sensitivity when the magnitude of the disturbance is small.

Further details and further examples of embodiments are provided below, where the coupling arrangement is referred to as an "clip-on".

Coupling to a fibre (or a cable): this approach lends itself particularly well to indoor applications where there is a long term need for a convenient 'access point' to a fibre via a clip-on. FIGS. 2a,2b show an example in the form of a wall-mounted fitting, similar in size to a light switch.

For the wall-mounted receiver side of the clip-on a short length of primary coated fibre, typically 3 cm, is embedded in a wedge comprising a suitable rigid material capable of efficiently coupling vibrations to the fibre. In practice fibre tails would emerge from each side of this wedge so that the unit can be readily spliced into the associated fibre cable during installation. For the transmitter side of the clip-on a vibrating transducer is embedded in a suitable rigid material chosen again for its coupling efficiency. The transducer is electrically terminated so that, upon application of a data signal, a property of the device can be modulated. This modulation can take many forms, for example, the transducer with no data could be resonating at a constant frequency (equivalent a carrier signal in radio systems) and applying the data could modulate the intensity, frequency or phase of that carrier. Alternatively a shift-keying methodology could be used where the transducer only resonates during the '1's in the data stream, with no resonance during the '0's, or the reverse. The optimum choice of modulation methodology is ultimately the one that most efficiently couples data to the fibre.

FIG. 1 illustrates the principle behind coupling the data to the fibre. The transducer, suitably modulated, radiates vibrations into the surrounding material which is fashioned to focus them down on to the fibre. Clearly the two halves of the clip-on must be held in firm physical contact for effective coupling.

For the design of the transducer guidance can be taken from, for example, ultrasonic scanners of the kind used widely in medicine. They employ a transducer capable of resonating at typically 10 MHz and can support modulation sidebands approaching 6 MHz. Specialist researchers in that field might be valuable partners in developing a transducer for the clip-on.

Example applications of the invention: the clip-on can be used in situations where the fibre is already in place or where a new installation is required. In either case the clip-on greatly increases the uses to which the fibre can be put to, and caters for many practical circumstances. The following examples are not exhaustive but serve to highlight how the clip-on can enable new capabilities which can be exploited commercially across many business sectors.

Figure 8:
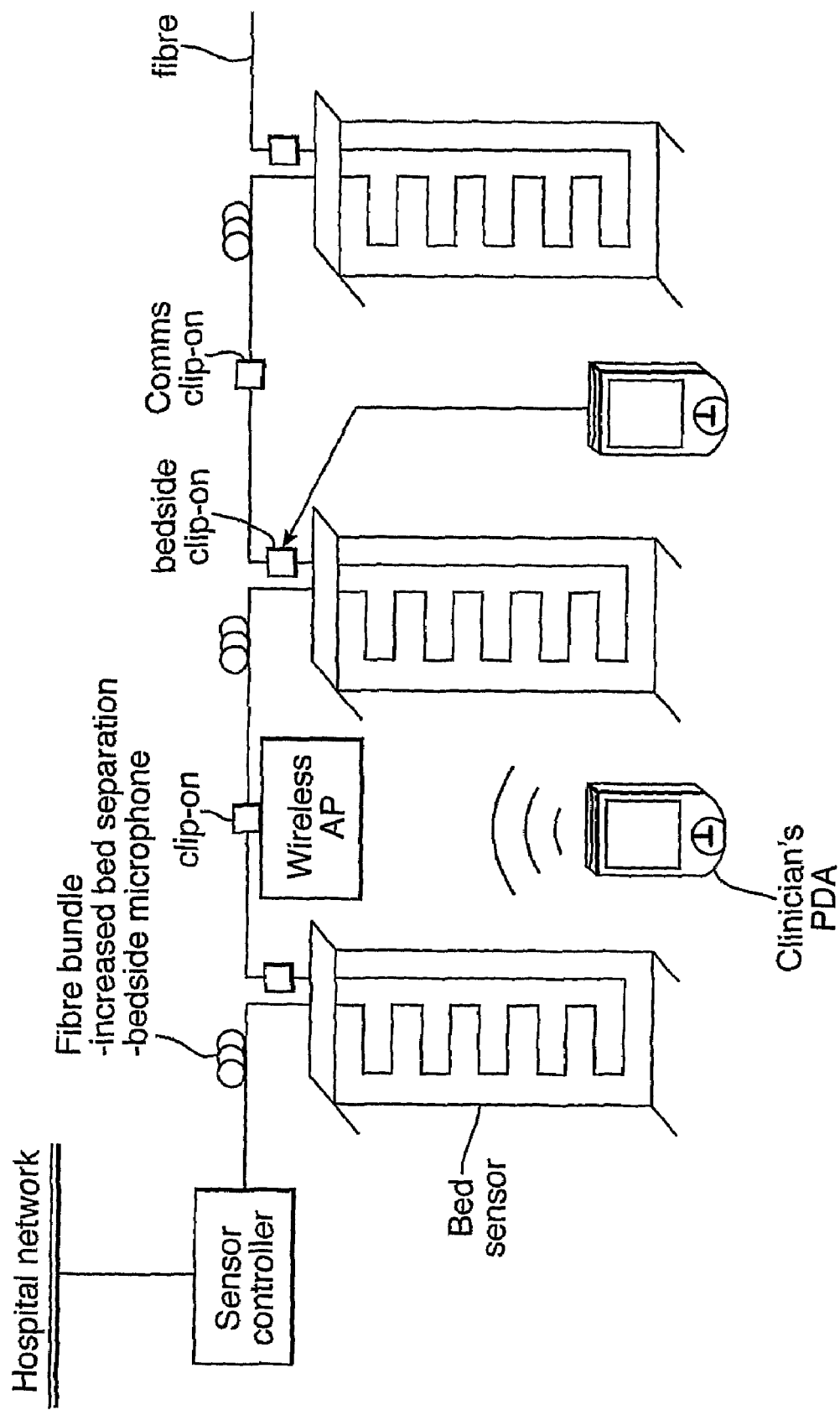

Infrastructure for hospital ward communications and sensors: in hospitals, labour intensive paper based means are used at the bedside, then entered on to the electronic system at a separate location. This is inefficient and open to errors. Deploying a single continuous fibre and a suite of clip-ons in each ward affords solutions to these issues and delivers an infrastructure which can be put to wider use. This is illustrated in FIG. 8.

Weaving a length of fibre into a sheet placed between the patient and the bed creates a pressure sensor for that particular bed. Occupancy of the bed can then be detected by the central sensor controller. By exploiting the locating capability of the sensor system the occupancy of multiple beds within the ward can be monitored (scalable to the whole hospital). The spatial resolution of this can be enhanced by fibre coils in the vicinity of each bed which artificially increase the distance between the beds. These coils intrinsically behave as acoustic pickups and so could be used by people at the bedside to alert the ward staff of an emergency at a particular bed, by speaking the necessary commands and details from the bedside (i.e., a voice activated emergency alert). Clearly ethical and privacy issues may arise from a microphonic capability at each bed, but a potential opportunity nevertheless exists to improve patient care.

A clip-on can be located by each bed, as is currently done for mains power, reading light, radio headphones, etc. Any electronic patient information device being used at the bedside can then upload data directly to the central hospital system. This can be done by physically connecting to a wall mounted clip-on (ref FIG. 1) by the bed or wirelessly to a ward-wide access point, which itself is connected to the network via a clip-on. Additional wall mounted clip-ons could be strategically located around the ward for general use or emergencies.

All of these capabilities and more not covered here can be delivered by one fibre, which of course can also be used to deliver conventional high speed data communication to the ward.

In practice there would need to be some means of disconnecting the bed from the fibre in FIG. 8 to allow bed-ridden patients to be moved around the hospital. Consequently each bed removed from the ward would need to be replaced promptly by a bed with a similar fibre sensor in order to maintain fibre continuity throughout the ward. Alternatively fibre splitters could be used to create a secondary path at each bed which would maintain continuity independent of the bed sensor. In either case, commercial fibre connectors could give bed the ability to be disconnected form the fibre, but realistically a design specifically optimised for hospital beds in a ward setting will be preferable, and that will require development.

Figure 9:
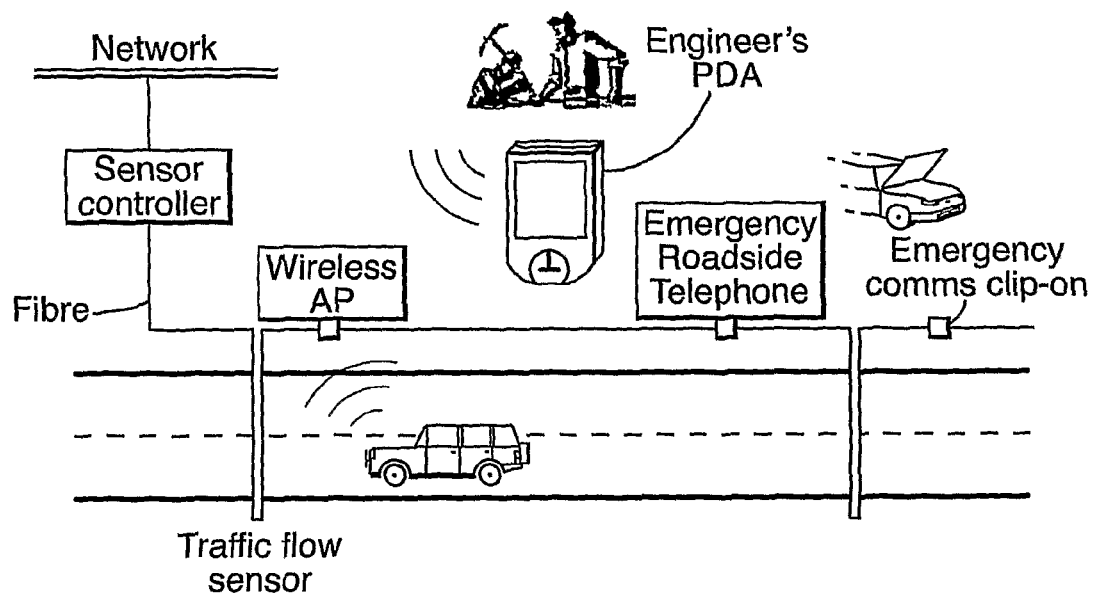

Traffic monitoring and road side communication: there is a growing need to continuously monitor traffic on main routes to prevent/manage congestion, police the speed limits, assist the emergency services, and so on. Coupled with that are emerging business opportunities for vehicles to upload data on engine performance, location etc to centralised service providers. This and similar opportunities can be addressed by deploying a fibre and suite of clip-ons along the roadside, as shown in FIG. 9.

The fibre functions is a vibration sensor which can be used to detect the passing of individual vehicles or groups. Placing the fibre under the road surface as shown increases its sensitivity, and repeating that at a known distance along the road gives the system a means of computing average speed.

Wireless access points and emergency communication points can be deployed along the fibre and connected via clip-ons attached to the outer sheath of the cable (ref FIG. 3) or the cable duct (ref FIG. 4), whichever is appropriate. The wireless connectivity would be available to all road users who have the necessary technology in their vehicles, whereas the cabled connectivity at the road side would be primarily for the emergency and breakdown services, and road maintenance crews.

Train tracker: for train operators to operate their rolling stock efficiently and safely it is vital that they know the location of all their trains. The current methodology for determining train location uses sensors embedded in the track at the required intervals. These are actuated when the bogies under the rolling stock momentarily short circuit the parallel rails as they pass over. This methodology has several practical limitations, the most critical being the high latency and the sensitivity to leaves on the line, which can disable the sensor. Maintaining these sensors and installing additional ones at new sites is costly and requires a fairly significant infrastructure along the trackside.

Figure 10:
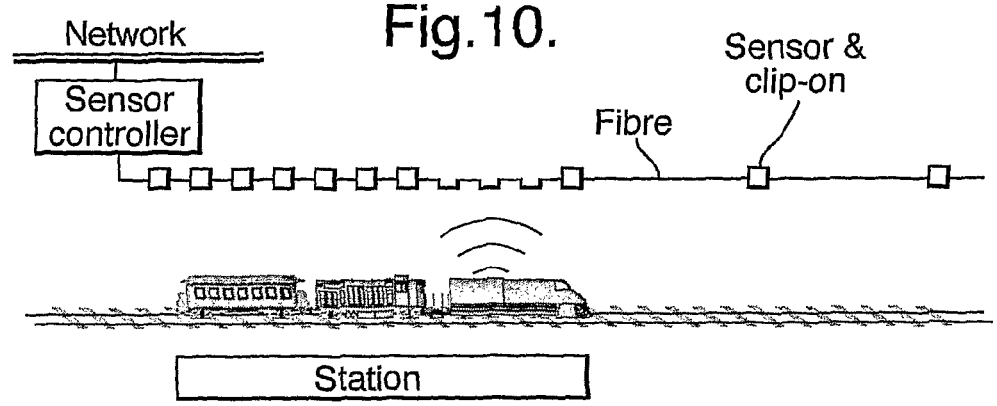

FIG. 10 shows how a trackside fibre and clip-ons can deliver a potentially more robust location system. Location sensors can be deployed along the trackside and connected to the fibre via suitable clip-ons. Each sensor will be triggered by the passage of the train using, for example, vibration or a radio pinger transmitted from the train. The location of each sensor can be determined by the sensor controller or from the unique header on the data packet, or perhaps both to maximise robustness. In practice sensors will be deployed close together within stations so that the relatively slow motion of the train can be reliably monitored, whereas a wider spacing is adequate between stations since the speed is high and train separation on the same track is (usually) sufficiently large.

Clip-ons combined with wireless access points along the trackside can also be used by the travelling passengers to upload data to service providers, along the lines illustrated in FIG. 9. Similarly, emergency services and trackside maintenance crews will have access via appropriate clip-ons.

Figure 11:
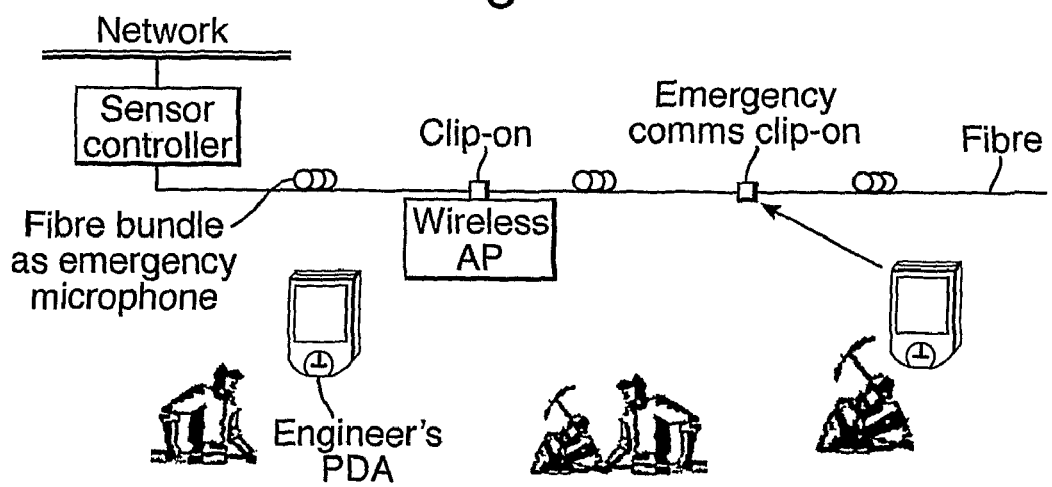

Underground tunnel or train system: as with surface train systems, there is also a critical requirement in underground train systems to know the location of trains, and the solution illustrated in FIG. 10 is an example of how that could be satisfied. However, more so with underground than surface train systems, there is a requirement for a robust communication infrastructure for the maintenance crews and emergency services. FIG. 11 shows a generic example of how that could be delivered.

Much of the infrastructure is similar to that shown earlier in FIG. 9, however the key differences to note in FIG. 11 are the provision of reliable wireless connectivity in an underground environment and the use of fibre coils as emergency microphones (ref FIG. 8). This microphone capability would allow a cry for help anywhere along the tunnel to be promptly detected and pin-pointed.

Figure 12:
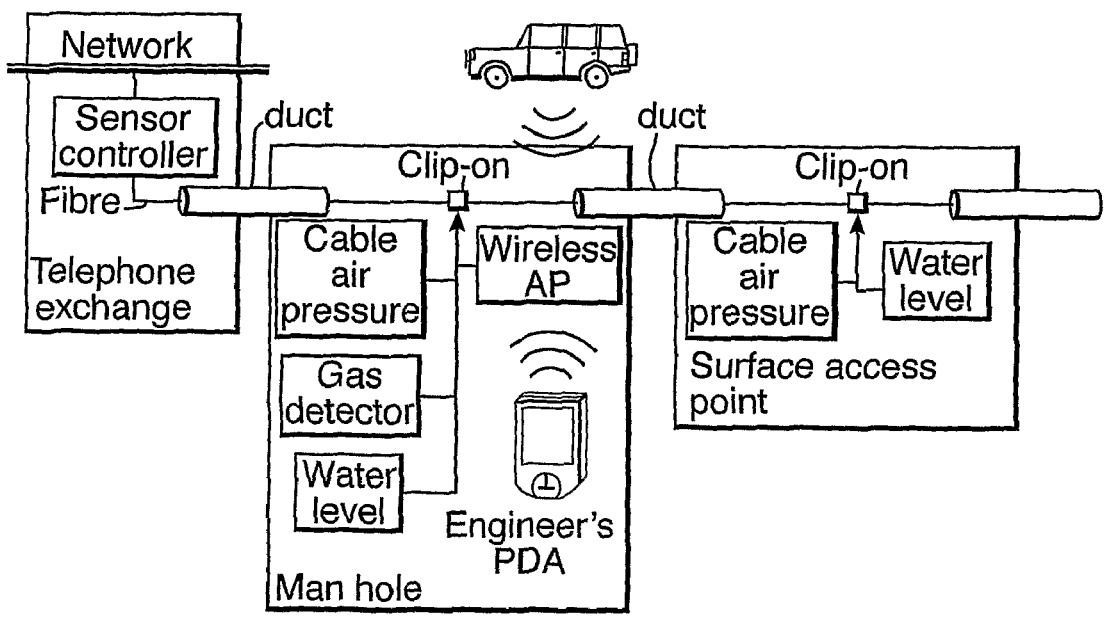

Remote environmental monitoring along a cable route: in remote monitoring methodologies for networks, the onset of possible failures can be detected early at a central location and remedial action taken before service outage occurs. Whereas this is relatively straight forward within buildings such as telephone exchanges and switching centres and the like, things become far less straight forward in the field, yet that is where the greatest vulnerability lies. Historically remote monitoring systems in the field on key trunk routes, monitor for example the air pressure in cable joints along the route, or water level in deep man holes, with the data being sent to the local exchange. Because of the cost and complexity of the infrastructure needed for these systems they are not widespread, and consequently the bulk of the cable plant in the network is not remotely monitored on a continuous or even periodic basis. This could be remedied by deploying sensors and clip-ons throughout the network, as shown in FIG. 12.

Clip-ons could be deployed at relevant locations along the route of the fibre cable, principally at man holes, surface access points, distribution cabinets and the like. A suite of sensors at each location deliver their data (continuously or periodically as required) to the clip-on which couples to the fibre (possibly via the sheath of the cable). The particular mix of sensors will be chosen in relation to the local circumstances, for example, perhaps full environmental monitoring in main man holes that house many primary routes, but a limited suite elsewhere. Where considered appropriate a wireless access point could also be connected to the clip-on, allowing the maintenance crew to upload data directly to the local exchange.

In one of the embodiments represented in FIG. 1 to 2, the wall-mounted wedge achieves good coupling to the fibre partly because it is embedded in a solid, acoustically conductive material, such as that used in medical ultra-sound scanning heads. Furthermore the fibre within the wedge would likely be stripped of its primary coating, although it would be left in-tact on either side of the wedge. The fibre and wedge are effectively a single factory-assembled piece.

Figure 13:
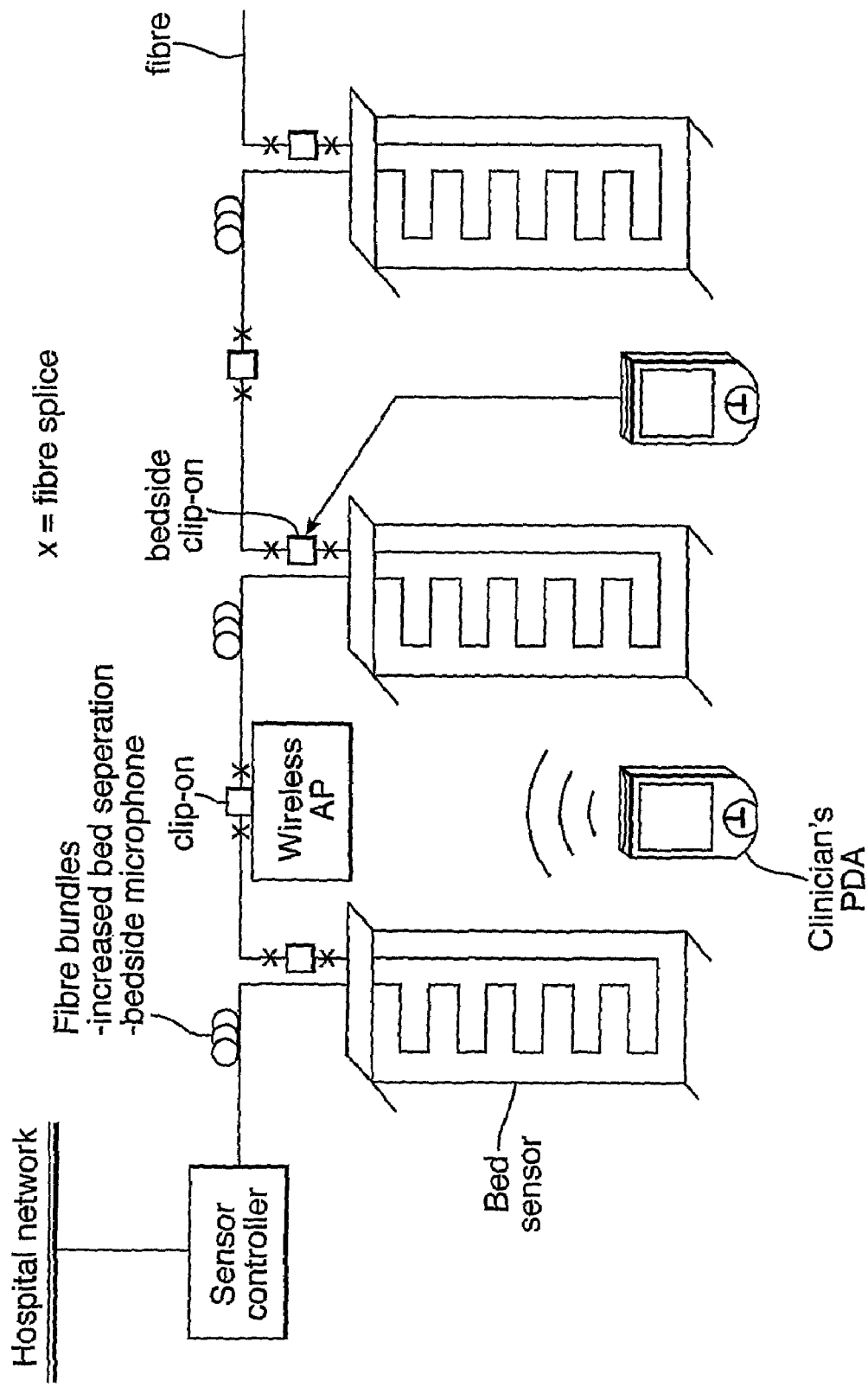

To deploy such an arrangement in practice, for example throughout a hospital ward, it will be necessary to limit the length of the fibre on either side of the wedge to short tails, say 2 m long. These tails would then be spliced to the fibre cable that is laid around the ward or whatever the locality is, see FIG. 13.

Although this approach is straight forward, the need to double-splice every wedge connector into the fibre infrastructure is time consuming and arguably the risk element in the installation process. A more efficient and robust approach would be to deploy a continuous fibre cable around the locality, then attach wedge connectors to the cable where required. This could be achieved by adopting a split-wedge concept.

Split wedge concept: by the designing the wedge as two passive elements which clamp together around the fibre cable (FIG. 6), the wedge can be readily retro-fitted to the cable. This will simplify the installation process and reduce potential weak points along the cable. This approach can be applied equally to a fibre cable that comprises merely a primary coated fibre, or a larger diameter cable with an outer protective polyethene sheath etc. The latter might be the cable of choice since it is more robust than primary coated fibre and hence can be installed with less risk of damage.

The invention claimed is:

1. A modulator arrangement for acoustically modulating optical radiation, the modulator arrangement comprising:
   an optical waveguide formed from a flexible material;
   a vibrator element for generating acoustic vibrations; and
   a coupling arrangement for releasably coupling the vibrator element to a portion of the waveguide,
   the coupling arrangement including a first coupling member secured to the portion of the waveguide at an attachment point, and a second coupling member secured to the vibrator element,
   wherein the second coupling member is releasably retained in an acoustically coupled position with the first coupling member, and
   wherein the first coupling member has a substantially rigid portion for retaining the shape of the portion of the waveguide when the second coupling member is released from the first coupling member.

2. A modulator arrangement as claimed in claim 1, wherein the first and second coupling members have a coupled state in which the vibrator element is coupled to the portion of the waveguide, optical link, and a decoupled state in which the vibrator means is not coupled to the portion of the waveguide, the first and second coupling members having respective first and second cooperating surfaces which oppose one another when the first and second coupling members are in the coupled state.

3. A modulator arrangement as claimed in claim 1, wherein a bore is provided in the first coupling member though which the portion of the optical waveguide extends.

4. A modulator arrangement as claimed in claim 1, wherein a cut out portion is provided in one of the first and second coupling members for receiving the other of the first and second coupling members.

5. A modulator arrangement as claimed in claim 1, wherein one of the first and second coupling members is provided with a wedge shaped portion, the other of the first and second coupling members being provided with a V-shaped groove for receiving the wedge shaped portion.

6. A modulator arrangement as claimed in claim 1, wherein a resilient member is provided for retaining the first and second coupling members in a coupled position.

7. A modulator arrangement as claimed in claim 1, wherein the optical waveguide is formed by an optical fibre, or an optical fibre cable having a protective sheath with one or more fibres therein.

8. A modulator arrangement as claimed in claim 1, wherein the vibrator element includes at least one region of piezoelectric material for generating vibrations.

9. A modulator arrangement as claimed in claim 1, wherein at least the first coupling member is arranged to provide, in the coupled state, a coupling medium for carrying acoustic vibrations to the waveguide.

10. A modulator arrangement as claimed in claim 1, wherein the first and the second coupling members are arranged to provide, in the coupled state, a coupling path for carrying acoustic radiation between the vibration element and the portion of the waveguide.

11. A modulator arrangement as claimed in claim 1, wherein the first coupling member includes a first component and a second component, each component having a respective arcuate receiving surface, such that when the first and second component are brought together, the receiving surfaces form a bore in which the optical waveguide can reside.

12. Communications apparatus including an optical link, a monitoring station for receiving sensing signals previously transmitted onto the optical link, and a modulator arrangement according to claim 1 for modulating data onto the sensor signals, wherein the sensing signals are formed by pairs of signal copies, which copies of a pair have a time delay relative to one another, and wherein the monitoring station is configured to combine the respective signals of a pair so as to extract the modulated data.

13. Communications apparatus as claimed In claim 12, wherein the monitoring station includes an optical source for transmitting the sensing signals onto the optical link, the sensing signals being returned along the link to the monitoring station.

14. Communications apparatus as claimed in claim 13, wherein reflector means are provided to return the sensing signals.

15. Communications apparatus as claimed in claim 12, wherein the time delay is greater than the inverse of the frequency of the modulation.

16. Communications apparatus as claimed in claim 12, wherein the delay is at least 30 µs.

17. Communications apparatus as claimed in claim 12, wherein the monitoring station includes interferometer means having a path difference associated therewith for introducing a time delay between signal copies of a pair.

18. Communications apparatus as claimed in claim 17, wherein the interferometer means is used to temporally re-align the returned signal copies of a pair.

19. Communications apparatus as claimed in claim 13, wherein the optical source has a coherence time associated therewith, the coherence time being longer than the time delay between copies of a pair.

20. A communication system including: an optical waveguide; a plurality of attachment points located at intervals along the optical waveguide; a protective covering for protecting the waveguide between the attachment points, the protective covering having a coupling area associated therewith; and, a removable acoustic modulator component for temporarily attaching to the waveguide at one of the attachment points, wherein at each attachment point there is provided a first coupling member permanently coupled to the waveguide, each first coupling member having a respective coupling area, the modulator component having a second coupling member for coupling to the coupling area of a first coupling member, the coupling area of each first coupling member being greater than the coupling area provided by the protective covering.

21. A modulator arrangement for acoustically modulating optical radiation, the modulator arrangement comprising:
 a waveguide formed from a flexible material;
 a vibrator element for generating acoustic vibrations; and
 a coupling arrangement for releasably coupling the vibrating element to a portion of the waveguide,
 the coupling arrangement including a first coupling member secured to the portion of the waveguide at an attachment point, and a second coupling member secured to the vibrator element,
 wherein the second coupling member is releasably retained in an acoustically coupled position with the first coupling member,
 wherein the first coupling member has a substantially rigid portion for retaining the shape of the portion of the waveguide when the second coupling member is released from the first coupling member, and
 wherein a bore is provided in the first coupling member through which the portion of the optical waveguide extends, the bore being arranged such that the portion of the waveguide is retained in the bore when the second coupling member is removed from the first coupling member.

* * * * *